US009563522B2

(12) United States Patent
Kandukuri et al.

(10) Patent No.: US 9,563,522 B2
(45) Date of Patent: Feb. 7, 2017

(54) DATA RECOVERY FOR A RELATIONAL DATABASE MANAGEMENT SYSTEM INSTANCE IN A HETEROGENEOUS DATABASE SYSTEM (71) Applicant: Oracle International Corporation, Redwood Shores, CA (US)

(72) Inventors: Anantha Kiran Kandukuri, Zurich (CH); Sabina Petride, Tracy, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 91 days.

(21) Appl. No.: 14/675,490

(22) Filed: Mar. 31, 2015

(65) Prior Publication Data
US 2016/0292049 A1 Oct. 6, 2016

(51) Int. Cl.
*G06F 11/00* (2006.01)
*G06F 11/14* (2006.01)
*G06F 17/30* (2006.01)
*G06F 11/20* (2006.01)

(52) U.S. Cl.
CPC ....... *G06F 11/1469* (2013.01); *G06F 11/1451* (2013.01); *G06F 17/30595* (2013.01); *G06F 11/1471* (2013.01); *G06F 11/2023* (2013.01); *G06F 11/2074* (2013.01); *G06F 11/2094* (2013.01); *G06F 2201/80* (2013.01)

(58) Field of Classification Search
CPC .............. G06F 11/1471; G06F 11/1469; G06F 11/1451; G06F 11/2023; G06F 11/2074; G06F 11/2094
See application file for complete search history.

(56) References Cited

U.S. PATENT DOCUMENTS

| 7,200,623 | B2 * | 4/2007 | Chandrasekaran . G06F 12/0804 |
| 7,496,783 | B1 | 2/2009 | Graf |
| 8,484,163 | B1 | 7/2013 | Yucel |
| 9,021,296 | B1 | 4/2015 | Kiselev |
| 2004/0019821 | A1 | 1/2004 | Chu |
| 2004/0230691 | A1 * | 11/2004 | Wookey ............ G06F 17/30569 709/230 |

(Continued)

OTHER PUBLICATIONS

U.S. Appl. No. 14/675,497, filed Mar. 31, 2015, Office Action.

*Primary Examiner* — Charles Ehne
(74) *Attorney, Agent, or Firm* — Hickman Palermo Becker Bingham LLP; Marcel K. Bingham (57) ABSTRACT

A method and apparatus for data recovery for a RDBMS instance in a heterogeneous database system is provided. A failure of a first RDBMS instance is detected in a plurality of RDBMS instances of a shared-disk database system. A compute cluster is configured to store, in memory, one or more tables stored by the shared-disk database system. The first RDBMS instance is configured to modify the one or more tables stored by the shared-disk database system and transfer modified data to the compute cluster to update the one or more tables at the compute cluster. After detecting the failure of the first RDBMS instance, redo records generated by the first RDBMS instance are scanned, pending modified data that was not transferred to the compute cluster before the failure is identified, and the pending modified data is transferred to the compute cluster.

20 Claims, 3 Drawing Sheets (56) References Cited

U.S. PATENT DOCUMENTS

| | | | | |
|---|---|---|---|---|
| 2012/0054533 A1* | 3/2012 | Shi | ................ | G06F 11/2094 714/4.1 |
| 2013/0042156 A1* | 2/2013 | Srinivasan | .......... | G06F 11/1443 714/54 |
| 2016/0292037 A1 | 10/2016 | Kandukuri et al. | | |

* cited by examiner

DATA RECOVERY FOR A RELATIONAL DATABASE MANAGEMENT SYSTEM INSTANCE IN A HETEROGENEOUS DATABASE SYSTEM

CROSS-REFERENCE TO RELATED APPLICATIONS

This application is related to co-pending application Ser. No. 14/675,497, filed concurrently herewith in the name of inventors Anantha Kiran Kandukuri and Sabina Petride, entitled "Data Recovery For A Compute Node In A Heterogeneous Database System," the entire contents of which is hereby incorporated by reference as if fully set forth herein.

FIELD OF THE INVENTION

The present invention relates to database management systems and more particularly to data recovery in a relational database management system (RDBMS) instance for a heterogeneous database system.

BACKGROUND

There has been emerging trend for accelerated databases where extreme database scalability is achieved by leveraging power of massively large number of computational nodes in efficient processing of analytical database workload. Such a system relies heavily on the data availability and correctness.

Data may be stored in a large cluster of nodes to take advantage of the aggregate memory and processing power of a large number of nodes. Clusters are available that operate on data that is stored in memory. Such clusters may lack persistent storage and access to transaction logs, and may relying instead on a traditional relational database management server (RDBMS) to be ACID (Atomicity, Consistency, Isolation, Durability) compliant, as expected in standard database systems. The cluster assists the RDBMS in processing the workload.

Failures, either in the RDBMS or the cluster, have a severe impact because they can lead to either data loss or data inconsistency. Several types of failure may affect transactional consistency. For example, when the RDBMS fails, change records used to maintain transactional consistency may be lost. When a node storing distributed data fails, the data must be completely reloaded from a source database. Typically, to prevent inconsistencies, the data must be locked or otherwise made unavailable during reloading.

Existing change propagation methods for synchronizing data between a source and a destination include log-based methods and load-based methods. Log-based methods replay, at the destination, transactional log records for operations performed on the source. For example, the transactions may be re-executed and applied at the destination in the order in which the transactions occurred. Load-based methods periodically reload one or more tables from the source to the destination.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A heterogeneous database system includes a multi-instance relational database management system (RDBMS) that maintains a data set. The heterogeneous database system further includes a cluster of diskless compute nodes (hereafter the "compute cluster"). Each compute node caches or stores a subset of the data set. The compute cluster assists the multi-instance RDBMS in performing distributed compute operations. For example, one or more tables of the data set maintained by the RDBMS may be cached by the compute cluster such that the compute cluster may perform distributed compute operations involving the one or more cached tables.

Although the compute nodes may have some database functionality, the compute nodes of the cluster do not function as independent databases. For example, the compute cluster is not ACID compliant and relies on the RDBMS to respond to queries in a transactionally consistent manner. The RDBMS maintains transactional consistency by transmitting consistent copies of modified data blocks to the compute cluster, where the consistent copies are consistent with the version stored at the RDBMS as of a particular logical timestamp.

The compute cluster may hold multiple versions of a data block, allowing the compute cluster to compute queries with different timestamps. When an RDBMS instance or a compute node encounters a failure, transactional consistency may be affected. When data is unavailable or when transactional consistency cannot be guaranteed due to a failure, the compute cluster may not be used to assist the RDBMS in performing compute operations.

As used herein, the term "data recovery" refers to data synchronization between two or more heterogeneous database systems after a failure event, such as to restore transactional consistency. Data recovery may be performed with and/or as a part of instance recovery and node recovery. As used herein the term "instance recovery" refers to recovery of a failed RDBMS instance in a RDBMS cluster. As used herein the term "node recovery" refers to recovery of a node in a cluster, such as a compute node in a compute cluster.

One or more techniques described herein are directed to data recovery after an RDBMS instance failure. In the case of a failure of an RDBMS instance, pending changes may be lost, such as changes not yet propagated to the nodes of the compute cluster. The compute cluster cannot be used to process queries due to potential data inconsistency caused by the unpropagated changes. To recover from a failure of a failed RDBMS instance, REDO records of the failed instance are scanned to identify modified data blocks that have not been transferred to the compute cluster. The modified data blocks are transferred to corresponding compute cluster nodes after data recovery of the failed instance is complete. This solution avoids logging information on a per-block basis and avoids reloading all the data blocks for any cached table to the compute cluster. In one embodiment, a low-watermark value is kept for each cached table to reduce the amount of REDO records that need to be scanned when recovering a failed instance.

System Overview

Figure 1:
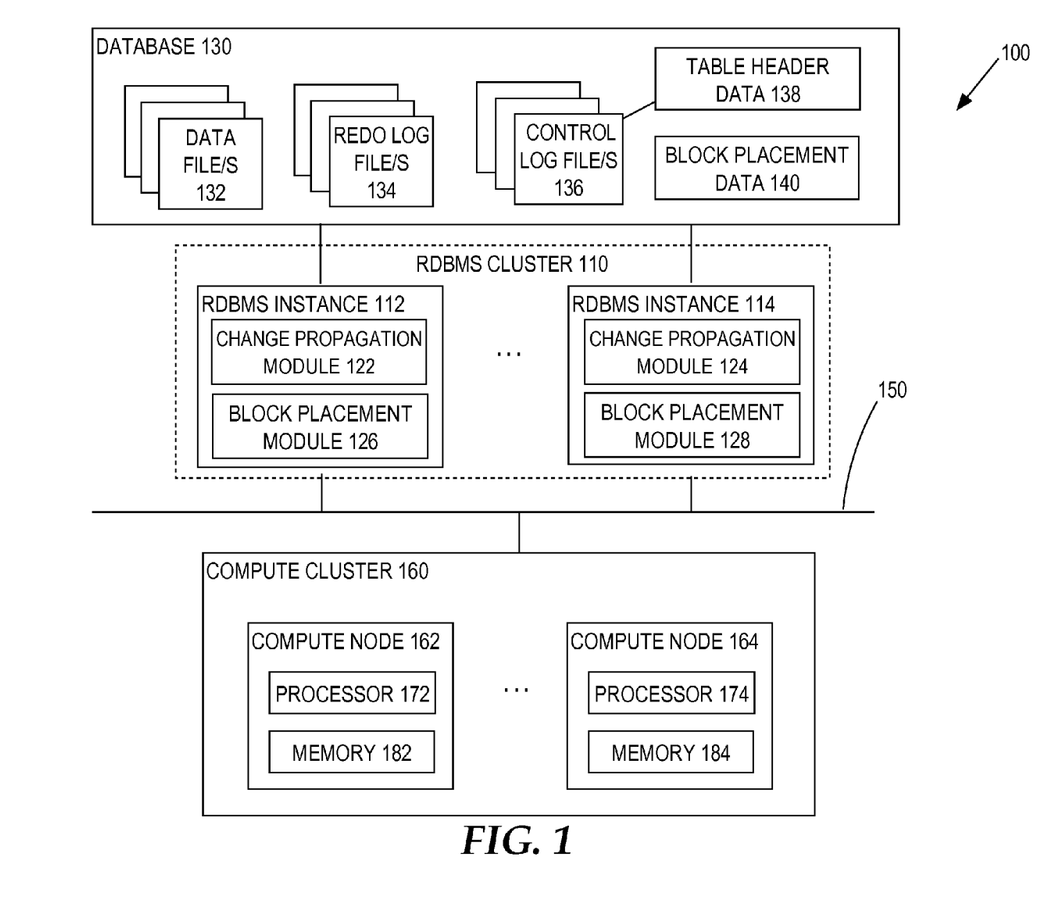
FIG. 1 is a block diagram depicting an embodiment of a heterogeneous database system.

An example architecture is described for a heterogeneous system comprising a cluster of RDBMS instances assisted by a compute cluster. FIG. 1 is a block diagram depicting an embodiment of a heterogeneous database system. Heterogeneous database system 100 includes RDBMS cluster 110 and compute cluster 160. Compute cluster 160 assists RDBMS cluster 110 to perform distributed compute operations. Although the compute nodes may have some database functionality, the compute nodes of the cluster do not function as independent databases. The compute cluster, the RDBMS cluster, and their interactions shall be described in greater detail hereafter.

RDBMS Cluster

RDBMS cluster 110 includes a plurality of RDBMS instances 112-114. RDBMS instances 112-114 are configured to access database 130. In one embodiment, RDBMS cluster 110 is a shared-disk database system, and RDBMS instances 112-114 are each configured to access database 130. One example of a shared-disk database system is the Oracle Real Application Clusters (RAC). Oracle RAC includes multiple servers or hosts connected to each other by a high bandwidth, low latency interconnect, such as communication infrastructure 150. For example, communication infrastructure 150 may comprise one or more networks, links, communication buses, communication fabrics, or any other communication infrastructure over which communication can be established between one or more components of heterogeneous database system 100 and one/or one or more clients thereof. In one embodiment, communication infrastructure 150 is a private network that connects RDBMS instances 112-114.

Each RDBMS instance 112-114 provides same the access and functionality to the entire data set stored in database 130. Database 130 comprises one or more data files 132, and one or more REDO log files 134, and one or more control files 136. Data files 132, and REDO log files 134, and control files 136 are shared between RDBMS instances 112-114 of RDBMS cluster 110. Data stored in database 130 is persisted in one or more data files 132. Data files 132 may be stored over one or more storage devices, such as one or more storage disks. In one embodiment, data files 132 are stored as one or more blocks over the storage device.

REDO Records

REDO log file/s 134 store data and metadata describing changes made to the database. REDO log files 134 may include individual REDO records that each correspond to a set of one or more changes to database 130. A REDO record includes data and/or metadata related to modifications performed on database 130. For example, a REDO record may specify one or more data block(s) being modified and their respective values before and after each database change. In one embodiment, REDO records are generated and stored in REDO log files 134 as changes are made to database 130. In one embodiment, the REDO records are ordered in time using a shared logical clock service that assigns a logical timestamp to each REDO record. As used herein, the term "logical timestamp" includes any data usable to uniquely identify an order between any two logical timestamps. A logical timestamp may be based on an actual time, an order, or any other data usable to indicate an order.

A logical timestamp may be associated with a REDO record, as well as any other event or point in the logical time space. For example, a failure event or a recovery event may occur at a point in the logical time space, and the order of such an event may be compared with a logical timestamp associated with REDO record. An example of a logical timestamp is a system change number (SCN) generated by a shared logical clock service in the Oracle RAC database system. A logical timestamp may be included in one or more REDO records and/or headers or other metadata. In one embodiment, the logical timestamp associated with a particular REDO record is also associated with the data block modified by the change recorded in the particular REDO record.

In one embodiment, REDO log files 134 include REDO records that are usable to reconstruct all changes made to database 130. For example, if a change to database 130 needs to be undone, such as when a transaction is not committed, one or more REDO records may be processed to undo the corresponding change. If a data file needs to be restored, a backup of the data file can be loaded, and one or more REDO records may be processed to replay changes made to database 130 since a time associated with the backup.

REDO log files 134 may be shared between one or more RDBMS instances 112-114. Alternatively and/or in addition, an RDBMS instance 112-114 may maintain one or more dedicated REDO log files 134. In one embodiment, RDBMS instances 112-114 write REDO records in blocks that are stored in database 130 such that each REDO record block corresponds to a particular RDBMS instance 112-114. Each RDBMS instance 112-114 may buffer REDO records locally and flush the buffered REDO records to REDO log files 134 when transactions are committed.

Control File

Control file/s 136 include data regarding the status and/or physical structure of database 130. For example, control file/s 136 file may include a database name, names and locations of associated data files, logical timestamp information associated with the creation of the database, a current logical timestamp for the database, and checkpoint information for the database. In one embodiment, control file/s 136 include table header data 138. For a particular table stored in database 130, table header data 138 identifies data blocks in database 130 that belong to a particular table.

Block Placement Module

In one embodiment, RDBMS cluster 110 and/or database 130 includes a block placement system comprising block placement modules 126-128. As shown, block placement module 126-128 is distributed. However, a block placement system may be implemented as a centralized system. Block placement module 126-128 uses a lightweight mapping system to determine a particular compute cluster to assign a particular data block. For example, the lightweight mapping system may map a particular data block to a particular compute node based on an identifier for the particular data block or other data associated with the particular data block. For example, the lightweight mapping system may use a mapping function, such as a hashing algorithm. In one embodiment, the mapping function is selected to distribute the data blocks evenly and/or to co-locate data with respect to tables that are related by a key.

RDBMS instances 112-114 may use block placement module 126-128 to determine which compute node of compute cluster 160 should cache a particular data block of a cached table. In one embodiment, the block placement module 126-128 uses a default mapping function to assign data blocks to compute nodes within compute cluster 160. When a particular data block is cached in a particular compute node in accordance with the default mapping function, then it is not necessary to store additional mapping data for the particular data block. In one embodiment, one or more data blocks are cached on a different compute node rather than following the default mapping function. For example, the different compute node may be necessary due to the inaccessibility of the default compute node indicated by the default mapping function, due to memory constraints of the default compute node, due to an optimization, or due to any other factor. When the default mapping function is not followed, the association between the particular data block and the alternative compute node is stored as block placement data 140. For example, when a default mapping function is used by block placement module 126-128, block placement data 140 comprises one or more exception mappings from data blocks to alternative compute nodes where the default mapping function was not followed. Thus, block placement module 126-128 may identify the location of any cached data block based on the default mapping function and block placement data 140.

Compute Cluster

Compute cluster 160 includes a plurality of compute nodes 162-164. Compute cluster 160 assists RDBMS instances 112-114 of RDBMS cluster 110 by performing distributed compute operations on one or more cached tables. In one embodiment, compute cluster 160 is massively parallel. For example, the number of compute nodes 162-164 in compute cluster 160 may be at least two orders of magnitude greater than the number of RDBMS instances 112-114 in RDBMS cluster 110. The massively parallel system has a high amount of aggregate memory 182-184 and processing resources.

Compute nodes 162-164 may each comprise one or more power-efficient processors 172-174. A power-efficient processor is a lower power processor that optimizes for efficiency rather than maximizing speed. In one embodiment, processors 172-714 comprise hardware infrastructure that is optimized for efficient processing of an analytical database workload. In one embodiment, compute nodes 162-164 do not have persistent storage. Compute nodes 162-164 cache one or more tables of database 130 by storing a portion of the one or more tables in memory 182-184.

Although compute nodes 162-164 may have some database functionality, compute nodes 162-164 of compute cluster 160 do not function as independent databases. For example, when compute nodes 162-164 do not have non-volatile storage, the compute nodes 162-164 do not store data durably. Furthermore, because the compute cluster cannot persistently store REDO logs, it cannot maintain transactional consistency when assisting the RDBMS to process queries. Although compute cluster 160 may assist RDBMS cluster 110 in performing computations to respond to a query, RDBMS cluster 110 maintains transactional consistency and responds to the queries in a transactionally consistent manner.

In one embodiment, compute cluster 160 coordinates with one or more RDBMS instances 112-114 to execute queries if it is determined or estimated that executing the query with the assistance of compute cluster 160 is more efficient than in the executing the query in the RDBMS alone. Executing the query with the assistance of compute cluster 160 may be transparent to the client that submitted the query to an RDBMS instance 112-114 of the RDBMS.

To coordinate conflicting data accesses and system management activities, compute cluster 160 uses may use an inter-node communication infrastructure, which may be similar to, same as, distinct from, and/or overlapping with communication infrastructure 150.

Change Propagation

Data stored in database 130 is modified by RDBMS instances 112-114 when RDBMS instances 112-114 handle data manipulation transactions. In order for compute cluster 160 to assist RDBMS cluster while maintaining transactional semantics, the modified data should be reflected in the cached data in the compute cluster 160. Heterogeneous system 100 is designed to provide transactionally consistent query execution. Therefore, every query executed with the assistance of compute cluster 160 is guaranteed to transactionally consistent with respect to a logical time associated with the query. In order to guarantee transactional consistency, data blocks stored in memory 182-184 need to be refreshed with changes to database 130.

RDBMS instances 112-114 of RDBMS cluster 110 are configured to transmit copies of changed data blocks to compute cluster 160. In one embodiment, RDBMS instances 112 include change propagation modules 122-124 (also referred to collectively as the "change propagation system"). Change propagation module 122-124 synchronizes data stored in memory 182-184 in compute cluster 160 with the database 130. Change propagation modules 122-124 monitor database 130 for data changes. For example, a change propagation module 122-124 deployed on an RDBMS instance 112-114 may monitor changes to database 130 by the corresponding RDBMS instance 122-124.

In one embodiment, change propagation module 122-124 works at the granularity of a data block stored in database 130. Change propagation module 122-124 identifies changed database blocks and transfers consistent read copies of the changed database blocks to the compute cluster 160. The particular changed data block will be updated at one or more compute nodes 162-164 that store the particular changed data block in memory 182-174. In one embodiment, compute cluster 160 may store multiple versions of data blocks in memory 182-184, allowing compute cluster 160 to compute queries with different logical timestamps.

RDBMS Instance Failure

When an RDBMS instance 112 fails, changes to the database 130 made by RDBMS instance 112 may be lost before the RDBMS instance 112 updates the compute cluster 160. For example, when failure of RDBMS instance 112 occurs, change propagation module 122 may be scheduled to transfer pending modified data blocks that have been changed in database 130. These pending modified data blocks have not yet been transferred to compute cluster 160 by change propagation module 122. When RDBMS instance 112 fails, the identity of these pending modified data blocks may be lost. Data stored in memory 182-184 at compute cluster 160 may become transactionally inconsistent if these pending modified data blocks are not updated. When data is unavailable or when transactional consistency cannot be guaranteed due to a failure, the compute cluster may not be used to assist the RDBMS in performing compute operations. Even if the RDBMS instance 112 is restarted, the data at compute cluster 160 may still be transactionally inconsistent. The compute cluster cannot be used to process queries until addressing and removing any potential data inconsistency caused by the unpropagated changes.

To perform data recovery after a failure of a first RDBMS instance 112, a second RDBMS instance 114 scans REDO records corresponding to the failed RDBMS instance 112 to identify modified data blocks. For example, the second RDBMS instance 114 may scan one or more REDO log files 134. Because REDO log files 134 in database 130 are durable and unaffected by RDBMS instance failures, the REDO records generated by the failed RDBMS instance 112 can be used to identify any data block that may be out of sync in database 130 and compute cluster 160 as a result of the failure of RDBMS instance 112.

In one embodiment, the first RDBMS instance 112 writes REDO records to a particular REDO log comprising one or more REDO log files 134, and the second RDBMS instance 114 scans the particular REDO log. Alternatively and/or in addition, the particular REDO log may be shared with one or more other RDBMS instances 112-114. In this case, the second RDBMS 114 filters the shared REDO log for REDO records generated by the first RDBMS instance 112. In one embodiment, the REDO records are scanned during instance recovery of the failed RDBMS instance 112.

For each modified data block that is identified, a latest version of the modified data block is transferred to the associated compute node/s 162-164. The modified data block may be transferred to the associated compute node/s 162-164 by the recovered first RDBMS instance 112, the second RDBMS instance 114, or another RDBMS instance 112-114 of RDBMS cluster 110. In one embodiment, the identified modified data blocks are transferred to the associated compute nodes after instance recovery of the failed RDBMS instance 112 is complete. In one embodiment, a modified data block is routed to a particular compute node 162 based on block placement data 140 maintained in database 130.

This solution avoids logging versioning information for each data block. No additional processing is required as database changes are processed. Instead, the solution uses an existing REDO log mechanism. Furthermore, this solution avoids reloading data blocks that have already been transferred to compute cluster 160. Only modified data blocks that are not yet propagated, such as by change propagation module 122, are transferred during data recovery. Furthermore, the change propagation system, such as change propagation modules 122-124 of RDBMS instances that are functional, may continue during instance recovery and data recover.

Low Watermark Value

In one embodiment, a low-watermark value is kept for each table of database 130 to reduce the amount of REDO records that need to be scanned when recovering a failed RDBMS instance 112. When a table has a particular low-watermark value associated with a particular logical timestamp, compute cluster 160 has versions of data blocks for the table that are recent as of the particular logical timestamp. All changes to the particular table with a logical timestamp before the particular low-watermark value have been acknowledged as transferred to the compute cluster 160.

The copy of the table stored at compute cluster 160 is transactionally consistent as of the low-watermark value for the table. When a table is first loaded into compute cluster 160, its low-watermark value is initialized based on a logical timestamp corresponding to a version of the table at database 130 that is used in the loading.

If a particular table has a particular low-watermark value, for REDO records describing changes to the particular table, a REDO record with a logical timestamp below the low-watermark value may be ignored when scanning the REDO records.

The low-watermark value can be used to define the starting point for scanning the REDO records after a failure is detected. In one embodiment, REDO log files 134 of database 130 may be truncated, where truncation is limited to the global low-watermark value. The global low-watermark value is the lowest low-watermark value for any table of database 130 that is cached in compute cluster 160. Thus, the global low-watermark value represents the logical time as of which all earlier data changes for cached tables are guaranteed to be present in compute cluster 160. In one embodiment, the REDO records are scanned from the global low-watermark value to a logical timestamp associated with the failure of the failed RDBMS instance 112. For example, the REDO records may be scanned from the global low-watermark value to the time of detection of the failure of RDBMS instance 112.

In one embodiment, the second RDBMS instance 114 scans REDO records to identify the pending modified data blocks of the failed first RDBMS instance 112 in parallel with one or more distributed instance recovery procedures implemented by RDBMS cluster 110.

Pending Modified Data Block Identification

In one embodiment, each REDO record includes a data block identifier and a change operation to the corresponding data block. The RDBMS instance 114 scans REDO records between a start value and an end value. For example, the start value may be the global low-watermark value and the end value may be the logical timestamp at which the failure of RDBMS instance 112 was detected. In one embodiment, only REDO records stored in REDO record blocks for the failed RDBMS instance 112 are scanned.

In one embodiment, based on scanning the REDO records, RDBMS instance 114 builds a list of potential pending modified data blocks by adding an entry for each REDO record that includes a change operation that modifies the corresponding data block, such as an INSERT, UPDATE or DELETE change operation. In one embodiment, the list does not include duplicate entries. When scanning is complete, the list includes all pending modified data blocks.

Modified Data Block Transfer

The list of pending modified data blocks is ready to transfer to RDBMS cluster. In one embodiment, RDBMS instance 114 waits for distributed instance recovery procedures of RDBMS instance 112 that are implemented by RDBMS cluster 110. For each pending modified data block on the list, a copy of the latest committed version of the pending modified data block is obtained from database 130 and transferred to compute cluster 160. In one embodiment, acknowledgements from the communication layer are tracked to ensure reliable data transfer.

In one embodiment, compute cluster 160 may already contain the latest version of an incoming database block. For example, when change propagation module 122 of failed RDBMS instance 112 may have transferred the data block without updating the low-watermark value of the corresponding table before failure. In this case, compute cluster 160 may simply acknowledge the incoming data block without applying any changes.

In one embodiment, one or more listed data blocks that were already transferred are identified by sending compute cluster 160 identifiers of the listed database blocks. Compute cluster 160 may respond with the logical timestamps for the latest version of the listed database blocks. The logical timestamps of the listed database blocks are used to filter database blocks for which compute cluster 160 already has the latest version. Such database blocks are not transferred to compute cluster 160.

After the transfer of the pending modified database blocks, data recovery is complete. The data stored at compute cluster 160 is now transactionally consistent. While data recovery is in progress, change propagation modules 122-124 of RDBMS instances 112-114 may continue to identify and propagate changes without interruption. For example, during data recovery of a failed RDBMS instance 112, even if a pending modified data block is further modified in database 130 by another change propagation module 122-124, compute cluster 160 will end up with the most recent version of the pending modified data block.

Example Data Recovery Process for a Failed RDBMS Instance

Figure 2:
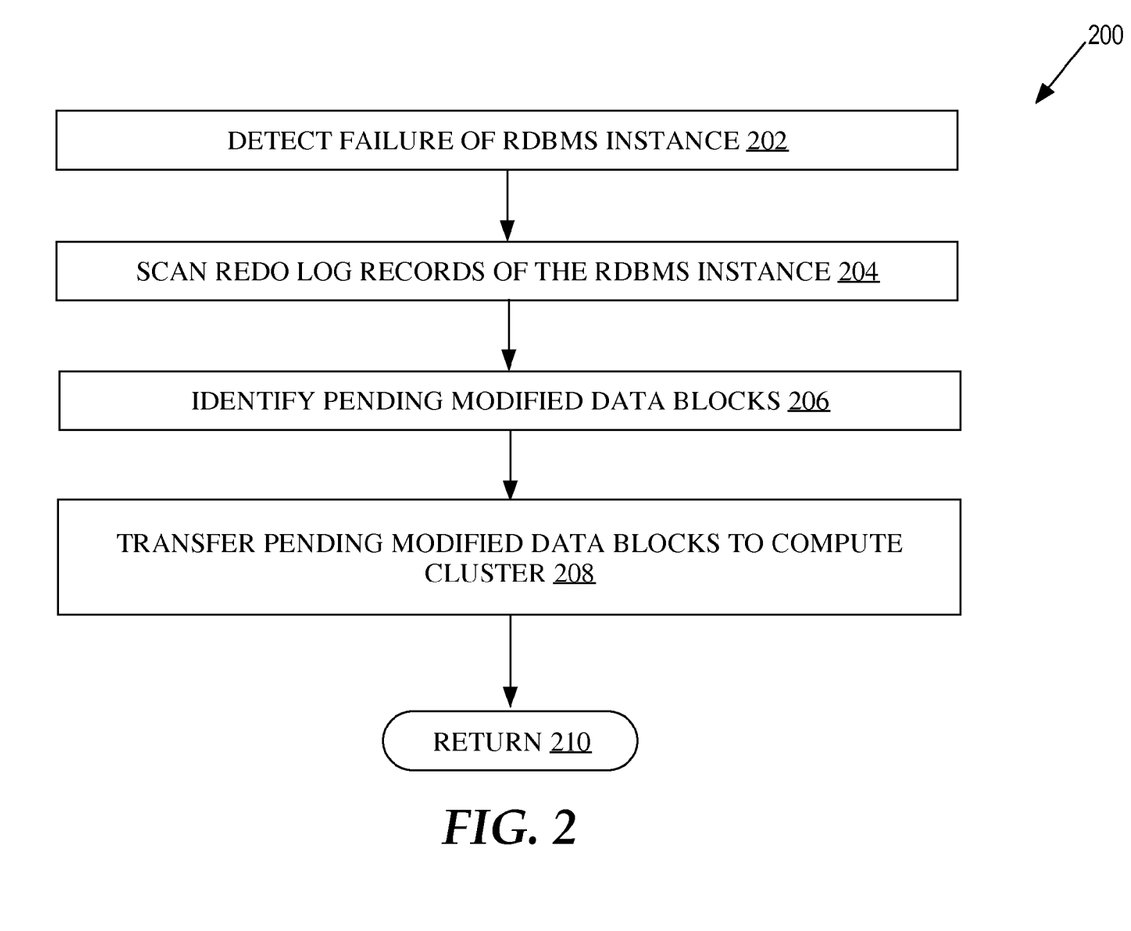
FIG. 2 depicts an embodiment of a method for recovering a failed RDBMS instance.
Figure 3:
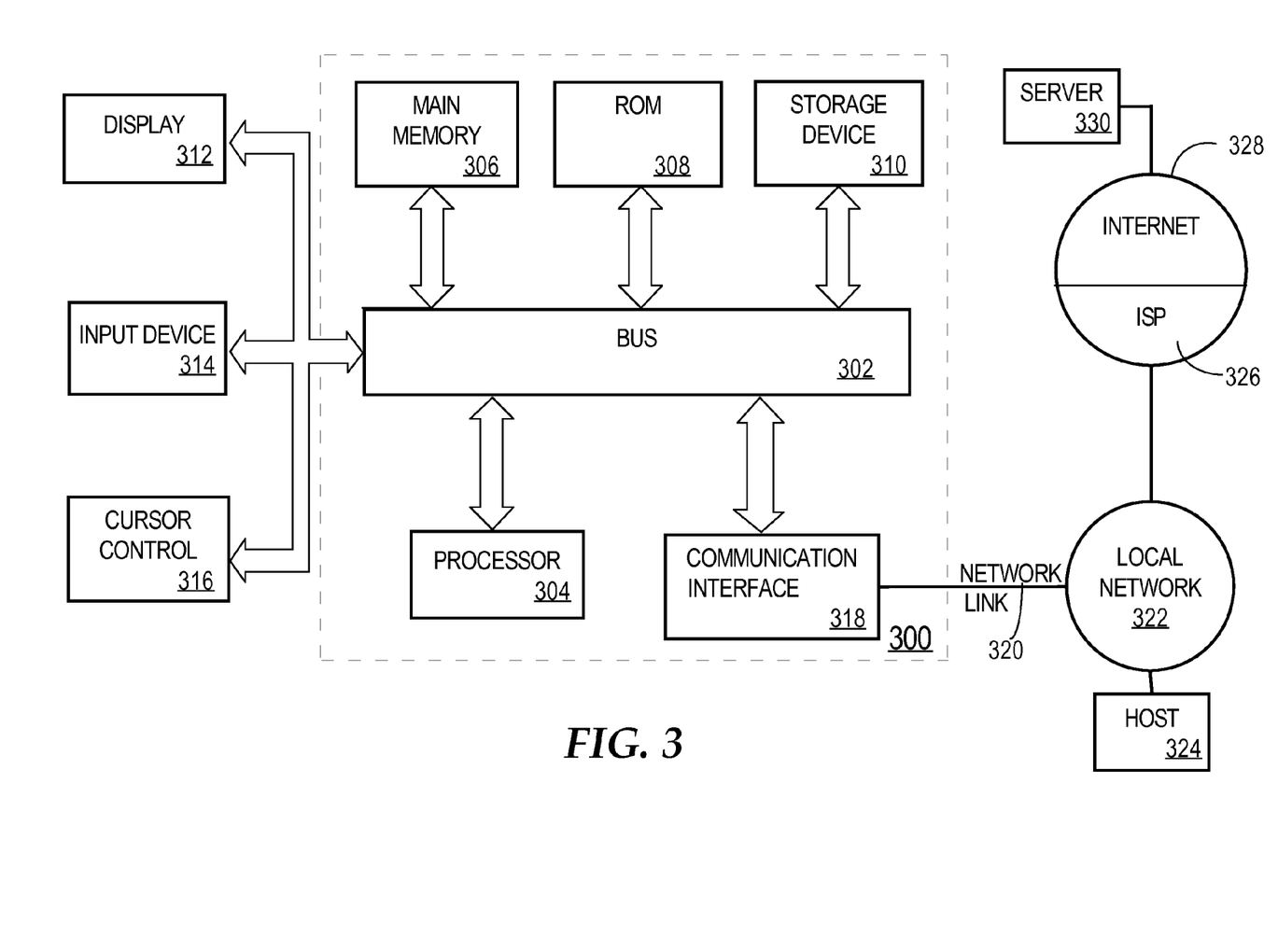
FIG. 3 depicts a computer system upon which one or more embodiments may be implemented.

FIG. 2 is a flowchart illustrating an embodiment of a process for replication. Process 200 may be performed by one or more computing devices and/or processes thereof. For example, one or more blocks of process 200 may be performed by computer system 300. In one embodiment, one or more blocks of process 200 are performed by one or more RDBMS instances 112-114.

At block 202, failure of an RDBMS instance is detected. The RDBMS instance is one of a plurality of RDBMS instances of a shared-disk database system. In one embodiment, the failure of the RDBMS instance is detected by another RDBMS instance of the shared-disk database system. The RDBMS instance is configured to modify the one or more tables stored by the shared-disk database system and transfer the modified data to a compute cluster to update the one or more tables at the compute cluster. For example, the RDBMS instance may be configured to modify one or more modified data blocks stored by the shared-disk database system and transfer the one or more modified database blocks to the compute cluster. The compute cluster is configured to store, in memory, one or more tables stored by the shared-disk database system. In one embodiment, the compute cluster is configured to store, in memory, a plurality of data blocks corresponding to data blocks stored by the shared-disk database system for the one or more tables.

At block 204, redo log records generated by the failed RDBMS instance are scanned. In one embodiment, another RDBMS instance of the shared-disk database system scans the redo log records of the failed RDBMS instance after detecting the failure. In one embodiment, REDO records generated by the failed RDBMS instance are scanned from one or more low-watermark values. The shared-disk database system maintains one or more low-watermark values for the one or more tables stored in memory by the compute cluster. In one embodiment, redo records generated by the RDBMS instance are scanned from between the one or more low-watermark values and a logical timestamp corresponding to the detection of the failure of the first RDBMS instance.

At block 206, pending modified data blocks are identified based on the scanning of the redo log records. The pending modified data blocks are modified data blocks that were not transferred to the compute cluster before the failure. In one embodiment, the scanning and identification of the pending modified data blocks is performed on a per-table basis for each table stored by the compute cluster. For example, per-table scanning may be performed in one pass, even when multiple tables are cached, by tracking the particular low-watermark value for each table and identifying the pending modified data blocks for that table when the logical timestamp of a REDO log record for the table is in range (e.g. between the low-watermark value for the table and a time of failure of the RDBMS instance).

At block 208, the pending modified data blocks are transferred to the compute cluster. In one embodiment, the shared-disk database system includes a block placement system that assigns data blocks of the one or more tables to compute nodes of the compute cluster based on a default mapping function. The shared-disk database system maintains one or more exception mappings from one or more data blocks to one or more alternative compute nodes when the default mapping function was not followed. One or more target compute nodes are identified based on the default mapping function and the one or more exception mappings, and the one or more modified data blocks are transferred to the target compute nodes.

At block 210 method returns and/or terminates. For example, processing may continue to passing control to a calling process, generating any appropriate record or notification, returning after a method or function invocation, or terminating.

Database System Examples

Embodiments of the present invention are used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A query is a database command that includes request for information from the database that returns a record set, which may be an empty record set. A query is typically submitted as a statement in a query language that is interpreted by a database server to cause one or more database operations.

One database language for expressing the database commands is the Structured Query Language (SQL). There are many different versions of SQL, some versions are standard and some proprietary, and there are a variety of extensions. Data definition language ("DDL") commands are issued to a DBMS to create or configure database objects, such as tables, views, or complex data types. SQL/XML is a common extension of SQL used when manipulating XML data in an object-relational database. Data manipulation language ("DML") instructions are issued to a DBMS to manage data stored within a database structure. For instance, SELECT, INSERT, UPDATE, and DELETE are common examples of DML instructions found in some SQL implementations.

A multi-node database management system is made up of interconnected nodes that share access to the same database.

Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Implementation System Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that depicts a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    detecting a failure of a first RDBMS instance of a plurality of RDBMS instances of a shared-disk database system;
    wherein a compute cluster is configured to store, in memory, one or more tables stored by the shared-disk database system;
    wherein the first RDBMS instance is configured to modify the one or more tables stored by the shared-disk database system and transfer modified data to the compute cluster to update the one or more tables at the compute cluster;
    after detecting the failure of the first RDBMS instance, scanning redo records generated by the first RDBMS instance;
    identifying, based on said scanning, pending modified data that was not transferred to the compute cluster before the failure;
    transferring the pending modified data to the compute cluster;
    wherein the method is performed by one or more computing devices.

2. The method of claim 1, wherein said scanning and said identifying are performed by a second RDBMS instance of the plurality of RDBMS instances of the shared-disk database system.

3. The method of claim 1, wherein the compute cluster is configured to store, in memory, a plurality of data blocks corresponding to data blocks stored by the shared-disk database system for the one or more tables.

4. The method of claim 3,
    wherein the first RDBMS instance is configured to modify the one or more tables stored by the shared-disk database system by modifying one or more modified data blocks stored by the shared-disk database system;
    wherein the first RDBMS instance is configured to transfer modified data to the compute cluster by transferring the one or more modified database blocks to the compute cluster.

5. The method of claim 4:
    wherein the plurality of data blocks are assigned to compute nodes of the compute cluster based on a default mapping function;
    wherein the shared-disk database system maintains one or more exception mappings from one or more data blocks to one or more alternative compute nodes when the default mapping function was not followed;
    wherein transferring the one or more modified database blocks to the compute cluster comprises identifying one or more target compute nodes based on the default mapping function and the one or more exception mappings and transferring the one or more modified data blocks to the target compute nodes.

6. The method of claim 3, wherein said identifying, based on said scanning, the pending modified data comprises identifying modified data blocks that were not transferred to the compute cluster before the failure.

7. The method of claim 6, wherein said transferring comprises transferring, to one or more compute nodes, the modified data blocks that were not transferred to the compute cluster before the failure.

8. The method of claim 1, further comprising:
    maintaining, by the shared-disk database system, one or more low-watermark values for one or more tables stored in memory by the compute cluster, wherein all changes to a particular table with a logical timestamp before a particular low-watermark value have been acknowledged as transferred to the compute cluster.

9. The method of claim 8, wherein scanning the redo records generated by the first RDBMS instance comprises scanning redo records having a logical timestamp after the one or more low-watermark values.

10. The method of claim 9, wherein scanning the redo records generated by the first RDBMS instance comprises scanning redo records between the one or more low-watermark values and a logical timestamp corresponding to the detection of the failure of the first RDBMS instance.

11. One or more non-transitory storage media storing instructions which, when executed by one or more computing devices, cause performance of:
    detecting a failure of a first RDBMS instance of a plurality of RDBMS instances of a shared-disk database system;

wherein a compute cluster is configured to store, in memory, one or more tables stored by the shared-disk database system;

wherein the first RDBMS instance is configured to modify the one or more tables stored by the shared-disk database system and transfer modified data to the compute cluster to update the one or more tables at the compute cluster;

after detecting the failure of the first RDBMS instance, scanning redo records generated by the first RDBMS instance;

identifying, based on said scanning, pending modified data that was not transferred to the compute cluster before the failure;

transferring the pending modified data to the compute cluster.

12. The one or more non-transitory storage media of claim 11, wherein said scanning and said identifying are performed by a second RDBMS instance of the plurality of RDBMS instances of the shared-disk database system.

13. The one or more non-transitory storage media of claim 11, wherein the compute cluster is configured to store, in memory, a plurality of data blocks corresponding to data blocks stored by the shared-disk database system for the one or more tables.

14. The one or more non-transitory storage media of claim 13, wherein the first RDBMS instance is configured to modify the one or more tables stored by the shared-disk database system by modifying one or more modified data blocks stored by the shared-disk database system;

wherein the first RDBMS instance is configured to transfer modified data to the compute cluster by transferring the one or more modified database blocks to the compute cluster.

15. The one or more non-transitory storage media of claim 14:

wherein the plurality of data blocks are assigned to compute nodes of the compute cluster based on a default mapping function;

wherein the shared-disk database system maintains one or more exception mappings from one or more data blocks to one or more alternative compute nodes when the default mapping function was not followed;

wherein transferring the one or more modified database blocks to the compute cluster comprises identifying one or more target compute nodes based on the default mapping function and the one or more exception mappings and transferring the one or more modified data blocks to the target compute nodes.

16. The one or more non-transitory storage media of claim 13, wherein said identifying, based on said scanning, the pending modified data comprises identifying modified data blocks that were not transferred to the compute cluster before the failure.

17. The one or more non-transitory storage media of claim 16, wherein said transferring comprises transferring, to one or more compute nodes, the modified data blocks that were not transferred to the compute cluster before the failure.

18. The one or more non-transitory storage media of claim 11, wherein the instructions, when executed by the one or more computing devices, further cause performance of:

maintaining, by the shared-disk database system, one or more low-watermark values for one or more tables stored in memory by the compute cluster, wherein all changes to a particular table with a logical timestamp before a particular low-watermark value have been acknowledged as transferred to the compute cluster.

19. The one or more non-transitory storage media of claim 18, wherein scanning the redo records generated by the first RDBMS instance comprises scanning redo records having a logical timestamp after the one or more low-watermark values.

20. The one or more non-transitory storage media of claim 19, wherein scanning the redo records generated by the first RDBMS instance comprises scanning redo records between the one or more low-watermark values and a logical timestamp corresponding to the detection of the failure of the first RDBMS instance.

* * * * *